(12) United States Patent
Schambach et al.

(10) Patent No.: US 11,745,776 B2
(45) Date of Patent: Sep. 5, 2023

(54) MODULAR CART

(71) Applicant: High Life Systems LLC, Colorado Springs, CO (US)

(72) Inventors: David Schambach, Colorado Springs, CO (US); Steve Schambach, Colorado Springs, CO (US); Brock Derby, Colorado Springs, CO (US)

(73) Assignee: High Life Systems LLC, Colorado Springs, CO (US)

( * ) Notice: Subject to any disclaimer, the term of this patent is extended or adjusted under 35 U.S.C. 154(b) by 1 day.

(21) Appl. No.: 17/179,082

(22) Filed: Feb. 18, 2021

(65) Prior Publication Data

US 2022/0258782 A1 Aug. 18, 2022

(51) Int. Cl.
*B62B 1/20* (2006.01)
*B62B 5/00* (2006.01)
*B62B 1/00* (2006.01)

(52) U.S. Cl.
CPC .............. *B62B 1/208* (2013.01); *B62B 1/008* (2013.01); *B62B 5/0043* (2013.01); *B62B 5/0053* (2013.01); *B62B 5/003* (2013.01)

(58) Field of Classification Search
None
See application file for complete search history.

(56) References Cited

U.S. PATENT DOCUMENTS

| 6,470,981 | B1 * | 10/2002 | Sueshige | B60K 7/0007 |
| | | | | 180/65.6 |
| 7,762,561 | B2 * | 7/2010 | Clatt | B62B 5/0438 |
| | | | | 280/47.131 |
| 8,327,963 | B1 * | 12/2012 | Faulkingham | B62B 3/04 |
| | | | | 180/9.1 |
| 8,613,455 | B2 * | 12/2013 | Berrett | A61G 1/0225 |
| | | | | 180/21 |
| 9,415,789 | B2 * | 8/2016 | Sommers | B62B 1/042 |
| 9,986,731 | B2 * | 6/2018 | Mitchell | B62B 3/002 |
| 11,084,515 | B2 * | 8/2021 | Dettner | B62B 5/0046 |

(Continued)

FOREIGN PATENT DOCUMENTS

CN 106167035 A * 11/2016
CN 108128331 A * 6/2018 .............. B62B 1/12

(Continued)

*Primary Examiner* — James A Shriver, II
*Assistant Examiner* — Ian Bryce Shelton
(74) *Attorney, Agent, or Firm* — Perkins Coie LLP

(57) ABSTRACT

Embodiments of the present disclosure are directed to a cart frame and modular, motorized cart. In some examples, the cart frame may comprise a wheel assembly, handles, and a kickstand. A modular article (e.g., litter, stretcher, game basket, etc.) may be attached to the top portion of the cart frame via at least one fastener (e.g., buttons, snaps, hooks, buckles, quick-detach mounts, etc.). The handles may be foldable and extendable. The kickstands may also be foldable and extendable. The handles, in some embodiments, may serve a dual purpose by folding to a certain length to function as a kickstand. In other examples, the cart may comprise an engine that may be gas-powered or electric. A battery may be affixed to the cart frame that powers the electric engine. Other objects may also be attached to the cart frame or modular article, such as a winch, tow bar, light, bumper, etc.

16 Claims, 21 Drawing Sheets

(56) References Cited

U.S. PATENT DOCUMENTS

| | | | | |
|---|---|---|---|---|
| 2004/0026898 | A1* | 2/2004 | Tomchak | B62B 1/206 |
| | | | | 280/653 |
| 2005/0087958 | A1* | 4/2005 | Tomchak | B62B 1/20 |
| | | | | 280/653 |
| 2009/0212535 | A1* | 8/2009 | Darling, III | B62B 5/0023 |
| | | | | 280/651 |
| 2016/0039445 | A1* | 2/2016 | Sommers | B62B 1/10 |
| | | | | 180/19.1 |
| 2018/0215404 | A1* | 8/2018 | Hayashi | B62B 5/004 |
| 2018/0346007 | A1* | 12/2018 | Fielder | B62D 51/00 |
| 2020/0239055 | A1* | 7/2020 | Carlson | B62B 5/061 |
| 2021/0291885 | A1* | 9/2021 | Foreman | B62B 1/24 |

FOREIGN PATENT DOCUMENTS

| | | | | | |
|---|---|---|---|---|---|
| CN | 108791382 | A | * | 11/2018 | ............ B62B 1/14 |
| CN | 112193293 | A | * | 1/2021 | ............ B62B 3/02 |
| DE | 20210605 | U1 | * | 11/2002 | ............ B62B 1/18 |
| EP | 0913311 | A1 | * | 5/1999 | |
| FR | 2790434 | A1 | * | 9/2000 | ........... B60K 7/0007 |
| GB | 2466806 | A | * | 7/2010 | ............ B62B 1/12 |
| GB | 2516525 | A | * | 1/2015 | ............ A47C 17/64 |
| KR | 101232023 | B1 | * | 2/2013 | |
| KR | 20160003141 | U | * | 9/2016 | |

\* cited by examiner

MODULAR CART

TECHNICAL FIELD

The present application is directed to the fields of modular, motorized transport systems and apparatuses, including stretchers, litters, and hand carts with at least one wheel and axle.

BACKGROUND

A wide variety of hand cart transport systems and apparatuses exist today and have existed for thousands of years. For example, wheelbarrows and derivations of the wheelbarrow have been around since the 1st century BC. A wheelbarrow is a small cart with a single wheel at the front and two supporting legs and two handles at the rear, used typically for carrying loads in building-work and/or gardening. One drawback of hand-propelled vehicles, like the wheelbarrow, is that they are limited by the force of a single human pushing the cart. In other words, the speed and distance of a hand-propelled cart is directly tied to the strength and stamina of an individual human being.

Another drawback of hand-propelled carts, such as wheelbarrows, is that many of them are designed to be propelled in one direction. For instance, a standard wheelbarrow has a clearly delineated "front" and "back" portion, where the front of the wheelbarrow is usually where a wheel and axle will be located, and the back of the wheelbarrow is usually where the handles protrude from the wheelbarrow frame at approximately the same plane as the top of the barrow portion. Such a design requires the operator of the wheelbarrow (or similar hand cart) to turn the entire cart around when changing directions or, alternatively, operate the cart while moving backwards. Both methods of operation are inefficient.

Yet another drawback of carts, both hand-propelled and motorized, is that many permanently affix the frame to the load-carrying portion. For example, a standard wheelbarrow may involve welding the tray to the frame or bolting the tray to the frame. Such a design is not conducive to customizing the load-carrying portion of the cart. In another example, a stretcher may comprise a frame with wheels and a canvas spread across two parallel poles. In many cases, the poles are a fixed length and permanently affixed to the frame. As such, the litter portion of the stretcher is fixed at one size and material. In order to change out the litter for a smaller or bigger size or change out the material of the litter, for example, an entirely different and separate stretcher apparatus is typically required.

As such, a current need exists for a more powerful and customizable cart that can be configured to meet a variety of operator preferences and load-carrying requirements through a modular design.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
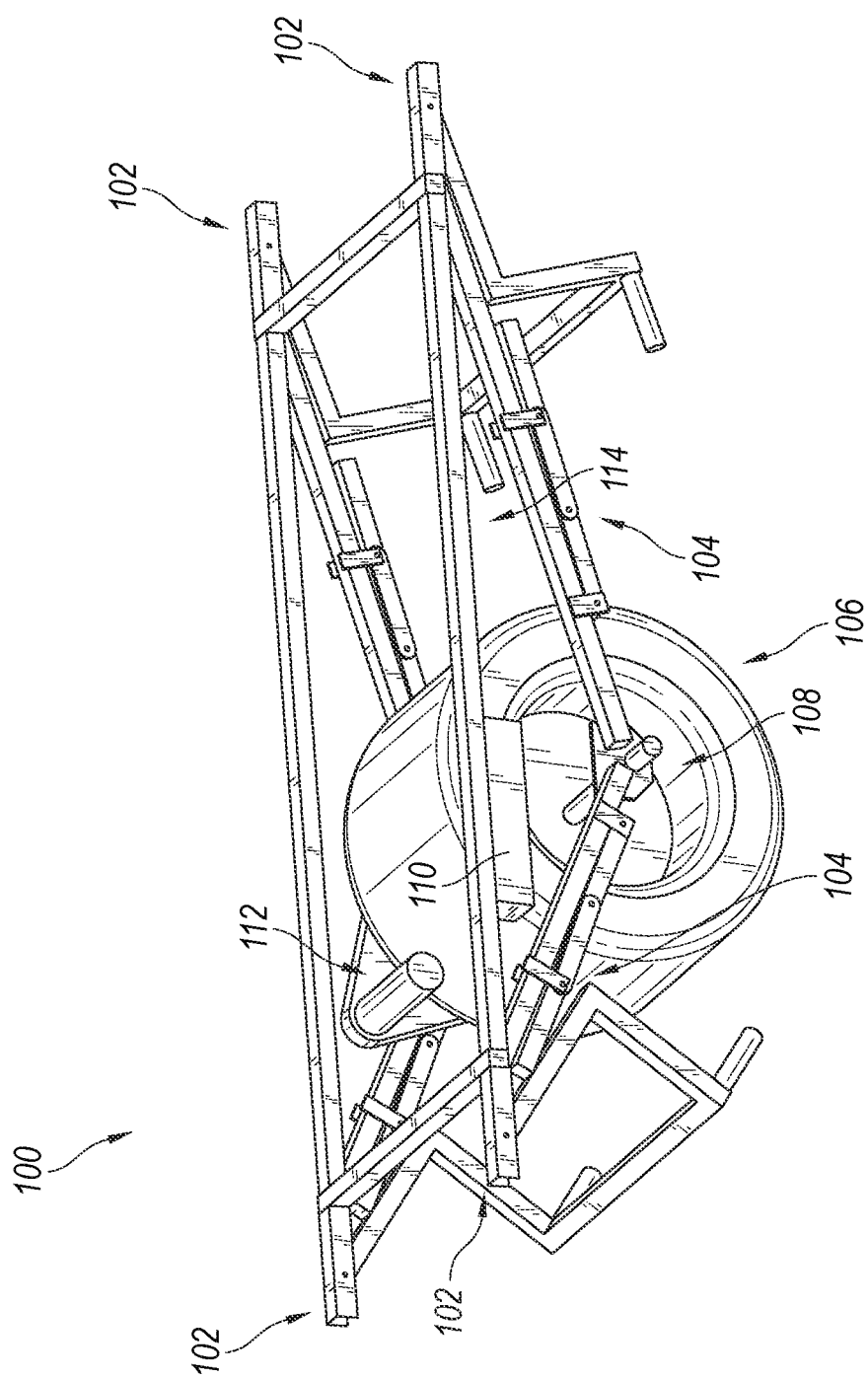
FIG. 1 is a side perspective view which illustrates a particular embodiment of the motorized cart frame.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. The following detailed description is, therefore, not to be taken in a limiting sense.

Embodiments of the present application are directed to a motorized cart, specifically to a cart frame with a fastener for connecting a modular (interchangeable) article. The fastener may include, but is not limited to, bolts and nuts, screws, rivets, buttons, buckles, snaps, clips, and quick-detach (QD) mounts (a.k.a. flush cup mounts), among other fasteners. The modular article that may connect to the top portion of the cart frame via the fastener may comprise a variety of possible objects, such as a litter, stretcher, basket, tray, cutting board (e.g., collapsible/foldable cutting board for butchering), and platform. The modular article may be composed of metal, fabric, plastic, wood, and/or a combination of the foregoing. The modular article may be perforated (e.g., net-like) and/or solid (e.g., uninterrupted metal tray).

In some examples, the modular article may also include additional connection means for, e.g., connecting to a helicopter and/or drone hook (e.g., winch, carabiner clip) and/or crane. In some instances, the connection means may be in the form of openings around the edges of the modular article (e.g., perforations on the long edges of a litter designed for helicopter and/or drone hoisting). A rope, or tag-line, may be weaved through the openings, connecting the litter to the helicopter/drone hoist. In another example, the additional connection means may comprise of at least one ring to which a hook (e.g., carabiner) can attach. In yet other examples, the additional connection means may be the same as the fastener. For instance, the fastener may comprise of QD mounts, and the additional connection means may also comprise of QD mounts.

The cart frame may comprise at least one wheel and axle. The wheel(s) may be small or large, thin or wide, and may comprise different tread components with deeper or shallower grooves and sharp, irregular edges designed to grip mud, snow, slush, ice, etc. For example, the wheel(s) may be a fat electric bike wheel, standard bicycle wheel, motorcycle wheel, ATV wheel, and/or car wheel. Some non-limiting embodiments of the cart frame may include two wheels, three wheels, or four wheels. In other embodiments, more than four wheels may be attached to the cart frame or kickstands, e.g., eight wheels may be attached to the cart to support larger cart frames, modular articles, and loads. Based on the requirements for the use case of the cart, as many wheels may be attached to the cart frame as necessary. The width of the wheel may be directly correlated to the output power and torque of a motor connected to the cart frame.

The wheel(s) may also be connected via a wheel fastener. The wheel fastener may be comprised of a quick-release (or quick-detach (QD) mounts). Such a quick-release wheel fastener may be utilized to quickly switch out different types of wheels to connect to the cart frame. This may be advantageous when driving the cart over different terrain (e.g., traveling from paved road to mountainous and rocky terrain). While on a paved road, a standard bicycle wheel may be sufficient to propel and stabilize the cart, whereas a wider e-bike tire may be more appropriate for muddy, rocky, and mountainous terrain.

The cart frame may comprise a motor. The motor may be a combustion (e.g., gasoline) motor or an electric motor. In some examples, the electric motor may be powered by a battery that is affixed to the cart frame. The battery may be detachable and require intermittent charging, or, in some examples, a solar panel may be affixed to the cart frame and/or the modular article, where the solar panel receives sunlight and converts the sunlight into direct current (DC) electricity to charge the battery. The DC electricity may be fed to the battery via a solar regulator which ensures the battery is charged properly and not damaged.

The cart frame may also comprise a storage cavity that may be attached to at least one of the crossbars of the cart frame. The storage cavity may sit below the modular article and above the wheel(s) and axle(s). The storage cavity may be composed of at least three wall portions—a bottom wall and two side walls. In some examples, a top wall may be added to create a fully enclosed storage cavity. In other examples, the top wall may be created by affixing the modular article to the cart, where the bottom side of the modular article also serves as the top wall of the storage cavity.

Other articles may be attached to the cart frame and/or modular article, such as a winch, tow bar, bumper guard (e.g., hoop bar), spare tire, D-ring shackle, light(s) (e.g., powered by a battery affixed to the cart frame that also powers an electric motor), etc.

The cart frame may also comprise handles. The handles may be fixed and/or may be adjustable. In some examples, the handles may be at a fixed height but can extend on the same plane as the cart frame, allowing the handles to move closer to or away from the cart frame and the modular article (if one is attached). Each handle may be individually extendable in some instances, and in other instances, the handles may be connected via a single crossbar, so the handles on each side of the cart frame are extended or contracted together. The handles may also be foldable, wherein the handles may fold inwards towards the wheel(s) and axle(s) and the rest of the cart frame. In some instances, the foldable handles may serve as kickstands while in the folded position. The foldable handles may fold approximately 45-90 degrees downwards from the extended position to a position where the ends of the handles are in contact with the ground. Each handle may be individually extended to further stabilize the cart frame. For example, if the cart was positioned on uneven terrain, one handle could be extended further than the other handle to further enhance stability of the cart frame. In other examples, the handles may be affixed to the modular article rather than the cart frame.

The cart frame may also comprise kickstands. The kickstands may be affixed to the lower angled crossbars that are connected to the axle(s). The kickstand may be individually extendable and contractible. In other words, in an embodiment with two kickstands affixed to separate angled crossbars, each kickstand can extend to a separate length. As noted earlier, the ability to individually extend the kickstands can help further stabilize the cart frame while on uneven terrain. In some embodiments, the kickstand(s) may be controlled by a quick-release mechanism, such as a mechanical lever or push button switch that is connected to one of the handles of the cart frame. The kickstand may be coupled to a spring-operated mechanism located on one side of the kickstand that folds into the rest of the cart frame. In the mechanical lever embodiments, when the lever is pulled (or button is pushed) on the handle, a cable attached to the lever and to the spring-operated locking device on the kickstand may be pulled at the same. The spring-operated lock on the kickstand will allow the kickstand to fold open from the rest of the cart frame. In a button-controlled embodiment, an electronic signal may be sent through electrical wires to a solenoid attached to the kickstand that triggers the locking mechanism to "pop" open the kickstand. In this example, the control system sends an electrical signal through a relay, to the fuse box, to the wire that is attached to the solenoid, and then to the solenoid itself.

FIG. 1 is a side perspective view which illustrates a particular embodiment of the motorized cart frame. Cart frame 100 is depicted in FIG. 1. Cart frame 100 may comprise handles 102. The handles may be fixed and/or foldable. Each handle may be individually extendable. Cart frame 100 may also comprise foldable kickstands affixed to the angled crossbars of cart frame that attach to the axel(s) 108 of wheel(s) 106. The kickstands are also individually extendable, which may be beneficial in stabilizing the cart on uneven terrain. The kickstands may also be connected to a mechanical lever and/or button-operated mechanism that is attached to at least one of the handles 102. When the lever is pulled or the button is pressed, the kickstands are deployed from the folded position on the crossbars. As noted previously, this release mechanism may be mechanically driven or electrically driven.

Cart frame 100 may also comprise a brake lever and a wheel throttle as part of the handles 102. The throttle may be used to control the power and speed of the motor driving the cart, and the brake lever may be used to slow down and eventually stop the cart.

Handles 102 may also be connected via crossbars (not pictured), so that handles 102 may be folded and extended uniformly. Specifically, for example, one hinge may be affixed to each side of the cart frame 100 so that the handles 102 may comprise a bar (instead of 4 individual handles). The handles 102 may be folded downwards to also serve as kickstands, in some embodiments.

Cart frame 100 also comprises a wheel 106 with an axel and suspension 108. In other embodiments, more than one wheel may be attached to the cart frame 100. The wheel 106 may be connected to cart frame 100 by a wheel fastener, including but not limited to quick-release fastener. Cart frame 100 may also comprise a battery 110 affixed to at least one of the crossbars of cart frame 100. Battery 110 may be connected to motor and gear assembly 112, wherein the motor is an electric motor powered by battery 110. Battery 110 may be detachable for charging and replacement purposes. Battery 110, in other embodiments, may be connected to at least one solar panel.

Cart frame 100 may also comprise a storage cavity 114. In some embodiments, storage cavity 114 may be enclosed (not pictured). The enclosed storage cavity may be comprised of at least one bottom portion (bottom wall) that may be used to hold objects. In other examples, the storage cavity may be enclosed with three walls: one bottom wall and two side walls, so the storage cavity 114 can hold and contain objects. When a modular article (not pictured) is placed on top of cart frame 100, the bottom side of the modular article may serve as the top wall of storage cavity 114, thereby fully enclosing the storage cavity 114.

Figure 2:
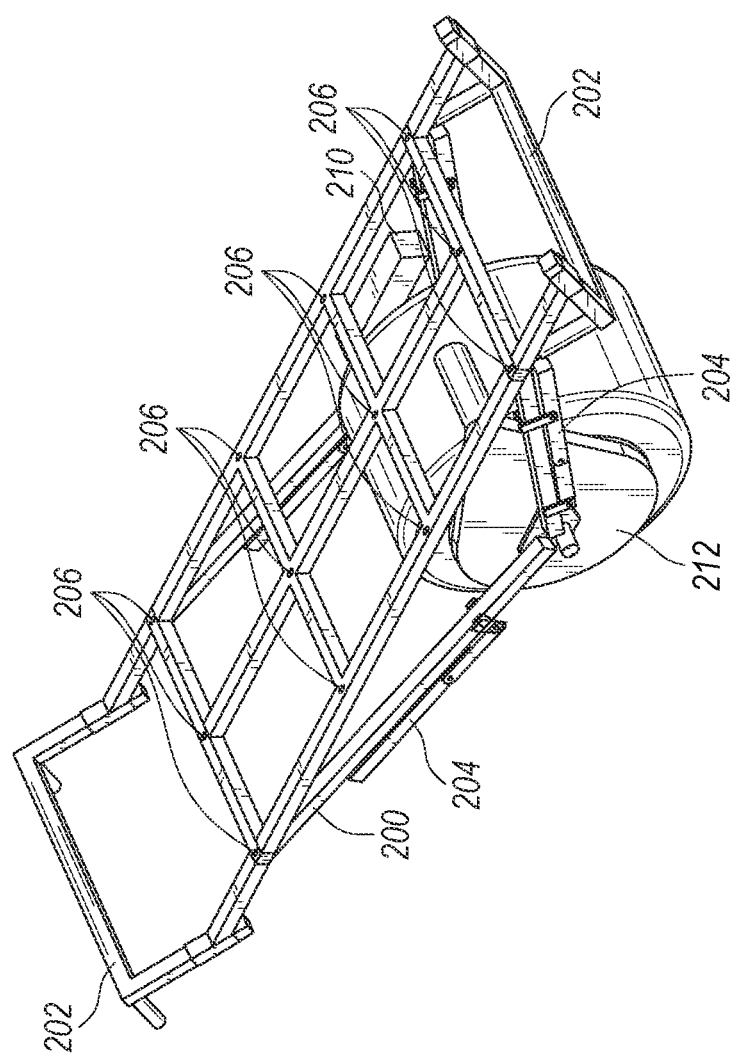
FIG. 2 is a top perspective view which illustrates a particular embodiment of the motorized cart frame.

FIG. 2 is a top perspective view which illustrates a particular embodiment of the motorized cart frame. Cart frame 200 is depicted with handles 202. Handles 202 may be foldable handles via hinges and/or QD clips, in some aspects. For example, the handles 202 on the right side of the cart frame 200 are in a folded position, while the handles 202 on the left side of the cart frame 200 are in an extended position. Cart frame 200 may also comprise kickstands 204 affixed to an angled crossbar that connects to the cart frame 200 and a wheel axle. The kickstands 204 as depicted in FIG. 2 are in a folded position.

Additionally, cart frame 200 may comprise QD mounts 206. As illustrated, QD mounts 206 may be affixed to the top part of the cart frame 200. Any number of QD mounts 206 may be affixed to the cart frame, and the number of QD mounts 206 that may be affixed to the cart frame 200 may be dependent on which modular article may be attached to cart frame 200. For instance, a larger/heavier modular article may require more attachment points that may necessitate more QD mounting points, whereas a lighter/smaller modular article may not require as many mounting points on cart frame 200.

The QD mounting points 206 allow for a variety of modular articles to be affixed to the cart frame 200. As described previously, the modular article that may connect to the top portion of the cart frame via the mounting points 206 may comprise a variety of possible objects, such as a litter, stretcher, basket, tray, cutting board (e.g., collapsible/foldable cutting board for butchering), and platform. Other modular articles may comprise military/defensive articles (e.g., weapons) and telecommunications devices, such as modular cell towers (e.g., that may be affixed to the cart frame 200). The modular article may be composed of metal, fabric, plastic, wood, and/or a combination of the foregoing. The modular article may be perforated (e.g., net-like) and/or solid (e.g., uninterrupted metal tray).

Cart frame 200 may also comprise a battery 210 affixed to at least one of the crossbars of cart frame 200. Battery 210 may be connected to motor and gear assembly 212, wherein the motor is an electric motor powered by battery 210. Battery 210 may be detachable for charging and replacement purposes. Battery 210, in other embodiments, may be connected to at least one solar panel.

Figure 3:
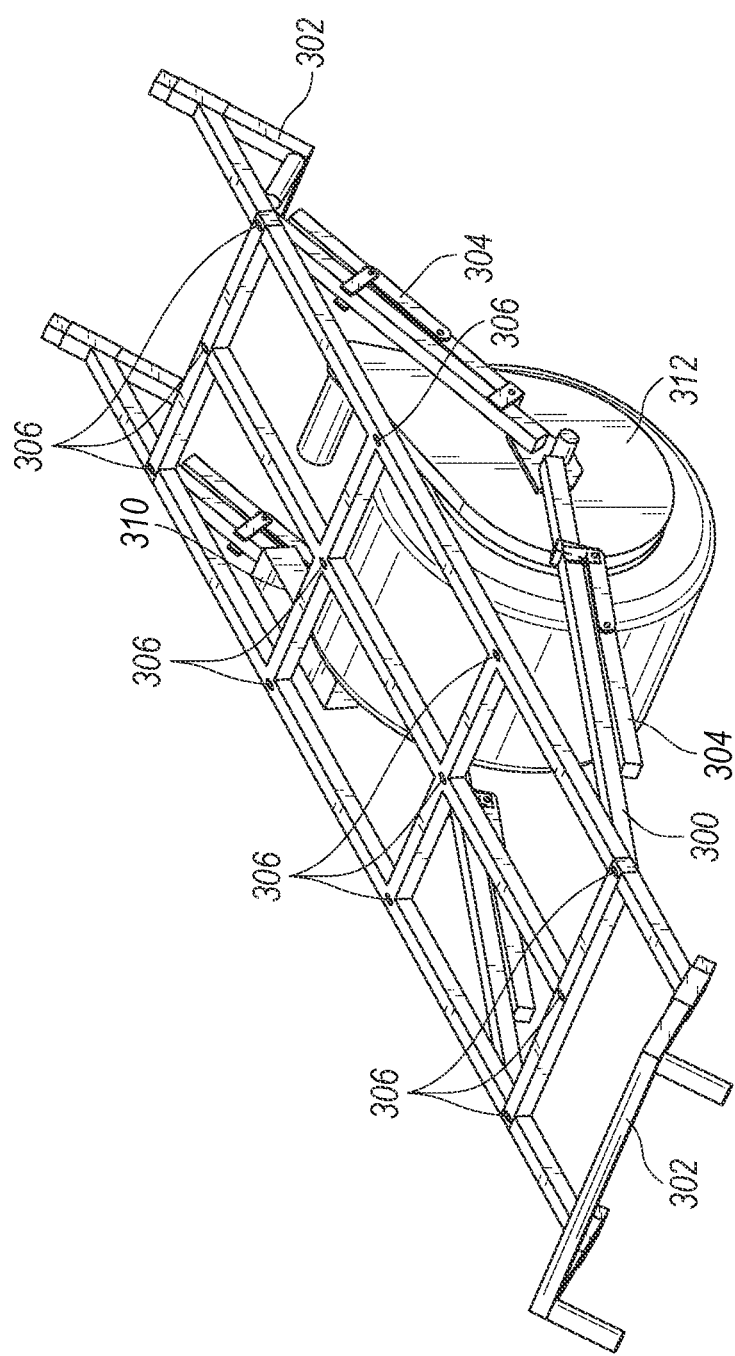
FIG. 3 is a top perspective view which illustrates a particular embodiment of the motorized cart frame.

FIG. 3 is a top perspective view which illustrates a particular embodiment of the motorized cart frame. FIG. 3 is similar to FIG. 2 in that it illustrates a cart frame 300 with several QD mounting points 306 on the top portion of the cart frame 300 for attaching (and detaching) modular articles to the cart. As depicted, cart frame 300 comprises foldable handles 302 that may be folded via a hinge mechanism. Handles 302 may be attached/detached from cart frame 300 via a mounting mechanism, such as QD mounts. In other embodiments, the handles 302 may be attached/detached via a sliding mechanism (e.g., snap buttons, push button snap spring clips, etc.), wherein the handles 302 may be affixed or removed from the cart frame 300.

Cart frame 300 also comprises kickstands 304 (shown in the folded position) and a battery 310 that may be connected to motor and gear assembly 312, wherein the motor is an electric motor powered by battery 310.

Figure 4:
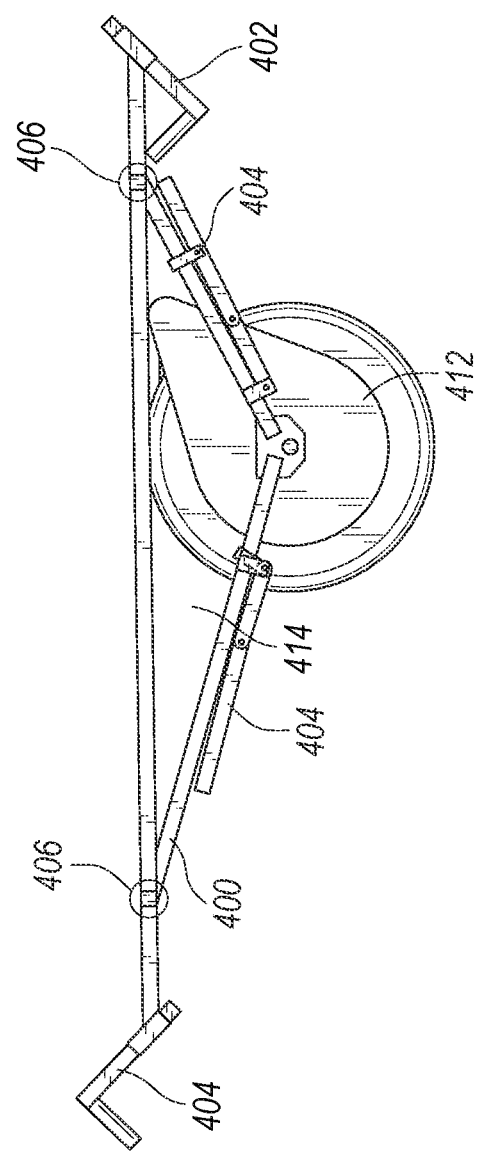
FIG. 4 is a side perspective view which illustrates a particular embodiment of the motorized cart frame.

FIG. 4 is a side perspective view which illustrates a particular embodiment of the motorized cart frame. Cart frame 400 is illustrated with handles 402 connected to cart frame 400 via QD mounts 406. As noted earlier, handles 402 may be connected to cart frame 400 via hinge and/or sliding mechanisms. Cart frame 400 also comprises kickstands 404 (shown in the folded position), as well as a motor and gear assembly 412. Cart 400 also comprises a storage area 414. On the underside of the crossbars on the top portion of cart frame 400, QD mounts may also exist, so that certain modular articles (e.g., storage tub, container, waterproof bag, etc.) may be connected to the underside of the cart frame 400 and fit within storage area 414. Storage area 414 may also be supported by handles 402, when the handles 402 are in the folded position (as shown on the right side handles 402).

Figure 5:
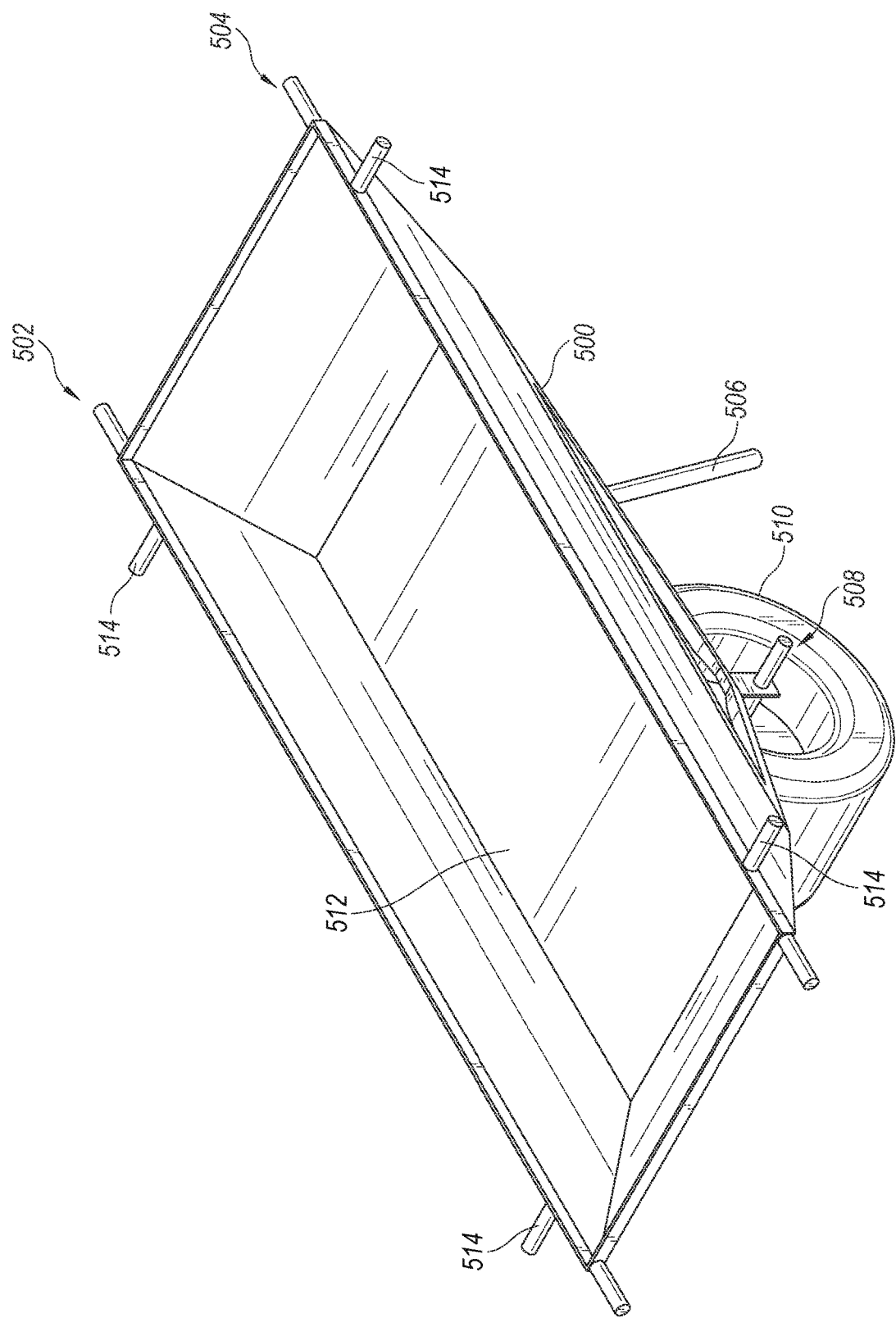
FIG. 5 is a top perspective view which illustrates a particular embodiment of the motorized cart.

FIG. 5 is a top perspective view which illustrates a particular embodiment of the motorized cart. Cart frame 500 is illustrated with a modular article 512 attached to the top of cart frame 500. The modular article 512 may be attached to cart frame 500 via at least one fastener. The fastener may include, but is not limited to, bolts and nuts, screws, rivets, buttons, buckles, snaps, clips, and quick-detach (QD) mounts (a.k.a. flush cup mounts), among other fasteners. The modular article 512 that may connect to the top portion of the cart frame 500 via the fastener may comprise a variety of possible objects, such as a litter, stretcher, basket, tray, cutting board (e.g., foldable/collapsible cutting board for butchering), and platform. The modular article 512 may include a drain, selectively openable and closable, to allow for dirt, debris, blood, waste, etc. to be drained from the basin of the modular article during use. The modular article may be composed of metal, fabric, plastic, wood, and/or a combination of the foregoing. The modular article may be perforated (e.g., net-like) and/or solid (e.g., uninterrupted metal tray). As shown in FIG. 5, modular article 512 may be a removable litter assembly that is made of metal and/or wood.

Cart frame 500 also comprises a braking mechanism 502 and throttle mechanism 504, both affixed to the handles protruding from the ends of the cart frame. In aspects, the braking mechanism 502 and throttle mechanism 504 may be affixed to either side of the cart frame 500 (i.e., right/left side agnostic). In some examples, the handles may be foldable and/or extendable. Side handles 514 may also be affixed to the cart frame 500 and/or the modular article 512. In FIG. 5, for example, the side handles 514 are affixed to the modular article 512.

Cart frame 500 also comprises at least one kickstand 506, an axle and suspension assembly 508, and a wheel 510. In some examples, the wheel 510 may be a standard bicycle wheel. In other examples, the wheel 510 may be a 19-inch all-terrain vehicle (ATV) wheel. In other embodiments, the cart frame 500 may comprise more than one wheel. The wheel(s) 510 may be affixed with wheel fasteners, such as quick-release fasteners.

Figure 6:
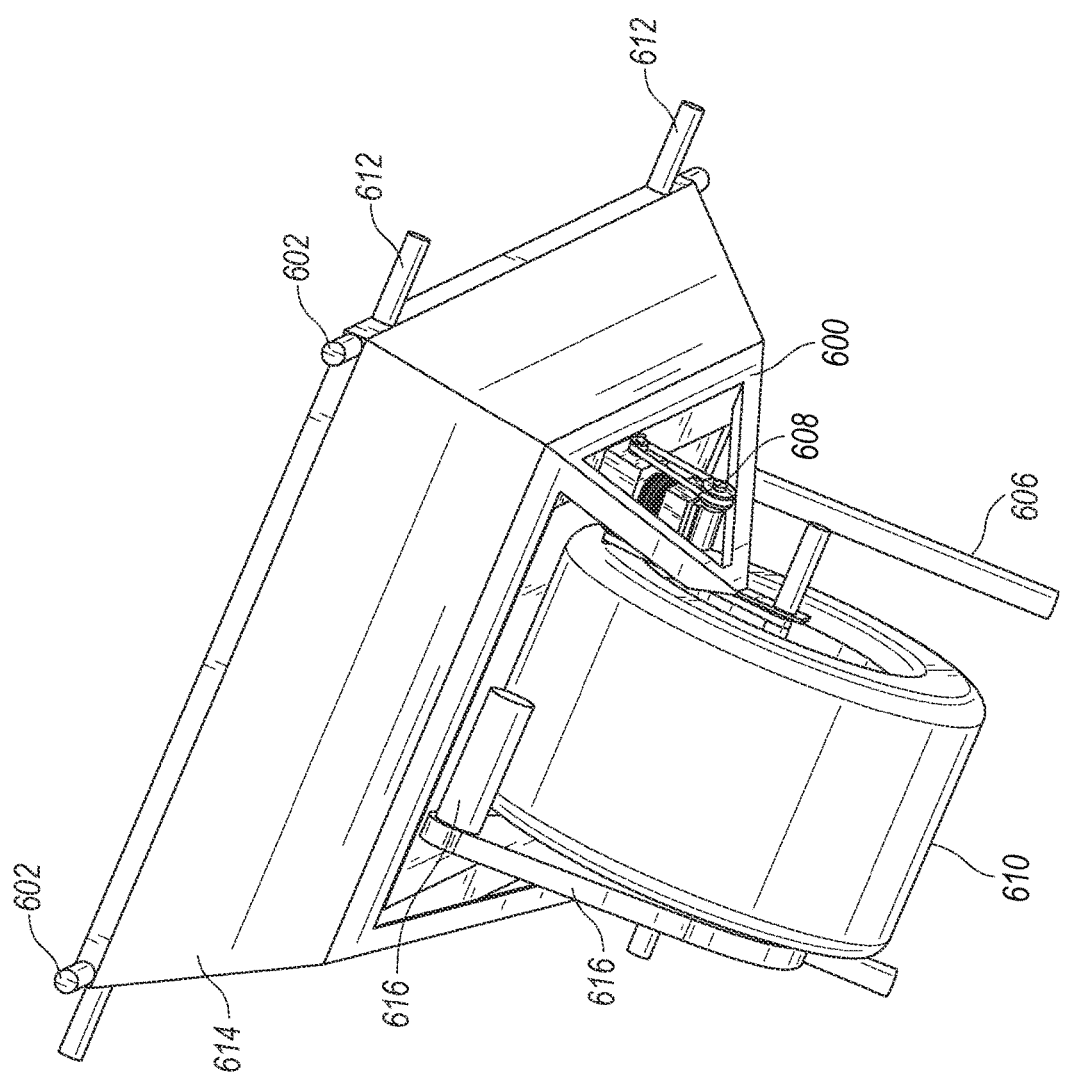
FIG. 6 is an end perspective view which illustrates a particular embodiment of the motorized cart, showing a motor.

FIG. 6 is an end perspective view which illustrates a particular embodiment of the motorized cart, showing a motor. Cart frame 600 is substantially similar to cart frame 200 from FIG. 2. Cart frame 600 comprises handles 602, side handles 612, kickstand 606, axel 608, wheel 610, and modular article 614 (e.g., removable litter assembly). Additionally, FIG. 6 depicts a motor and gear housing 616 that is adjacent to the wheel 610. As previously described, the motor affixed to cart frame 600 may be a combustion (e.g., gas) motor and/or electric motor.

Figure 7:
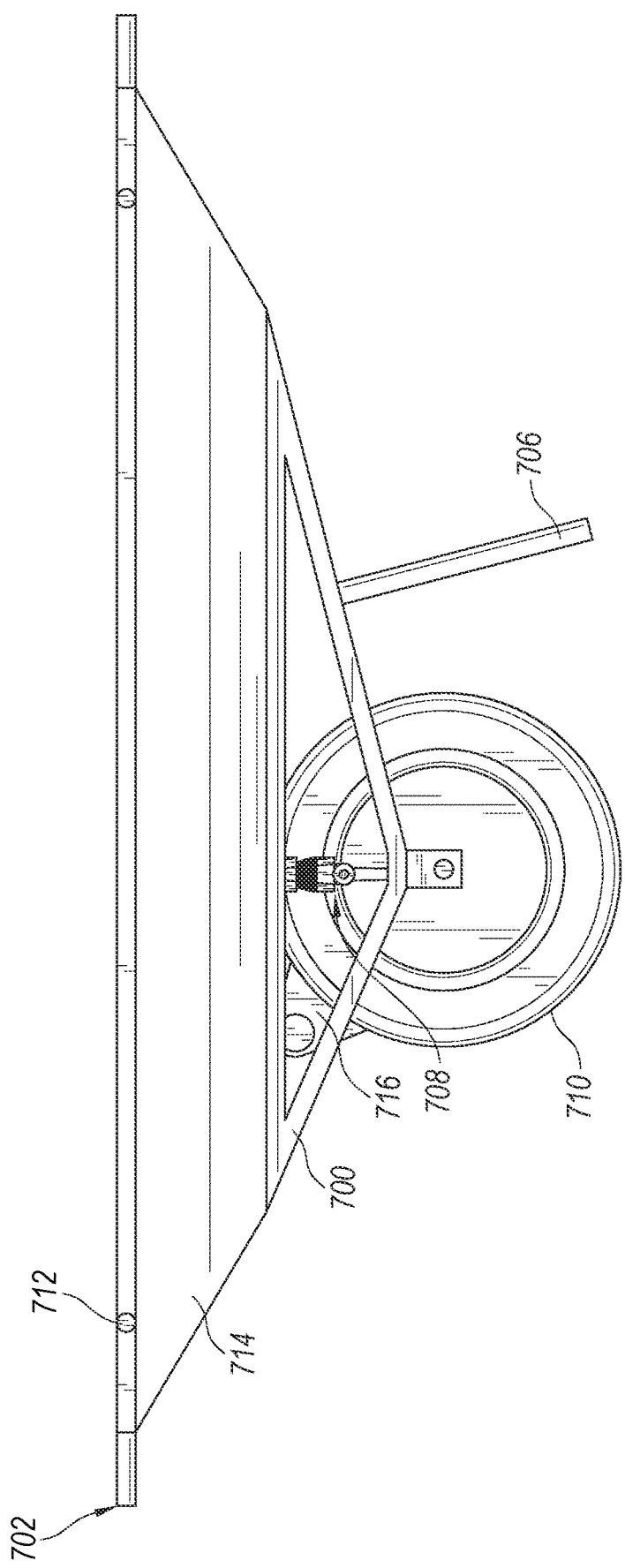
FIG. 7 is a side perspective view which illustrates a particular embodiment of the motorized cart.

FIG. 7 is a side perspective view which illustrates a particular embodiment of the motorized cart. FIG. 7 is substantially similar to FIGS. 2 and 3. FIG. 7 illustrates cart frame 700 with modular article 714 attached to the top portion of the cart frame 700. Modular article 714 comprises handles 702 and side handles 712 in this embodiment. Cart frame 700 also comprises kickstand 706, axel and gear assembly 708, wheel 710, and motor and gear housing 716.

Figure 8:
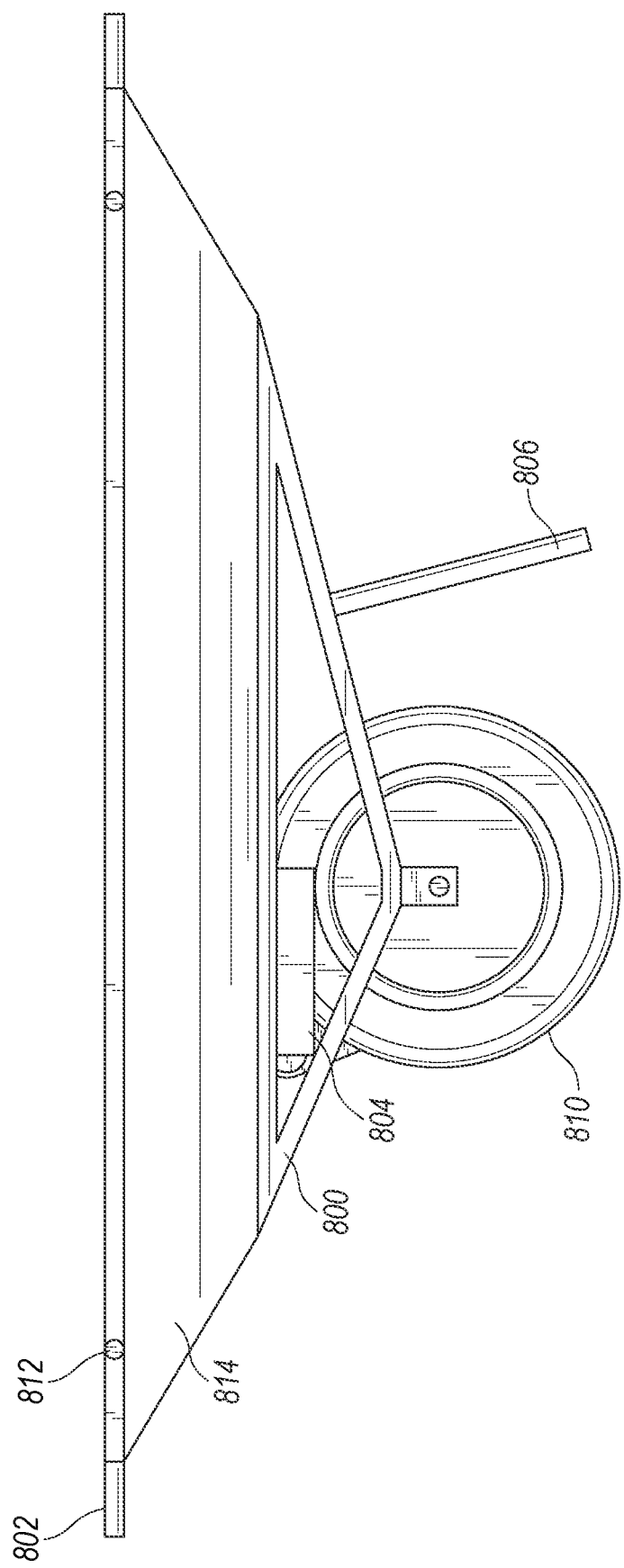
FIG. 8 is a side perspective view which illustrates a particular embodiment of the motorized cart with a battery affixed to the cart frame.

FIG. 8 is a side perspective view which illustrates a particular embodiment of the motorized cart with a battery affixed to the cart frame. FIG. 8 illustrates cart frame 800 with a wheel 810, kickstand 806, and modular article 814 attached to the top portion of cart frame 800. Modular article 814 comprises handles 802 and side handles 812, which may be extendable and/or collapsible. Further, cart 800 comprises battery 804 affixed to the underside of the top crossbar of the cart frame 800. Battery 804 may be connected to a motor powering the cart frame 800 and driving the wheel 810. In some embodiments, battery 804 may be a 48-volt lithium battery, but other size batteries may be used depending on the load to be transported by the motorized cart.

Figure 9:
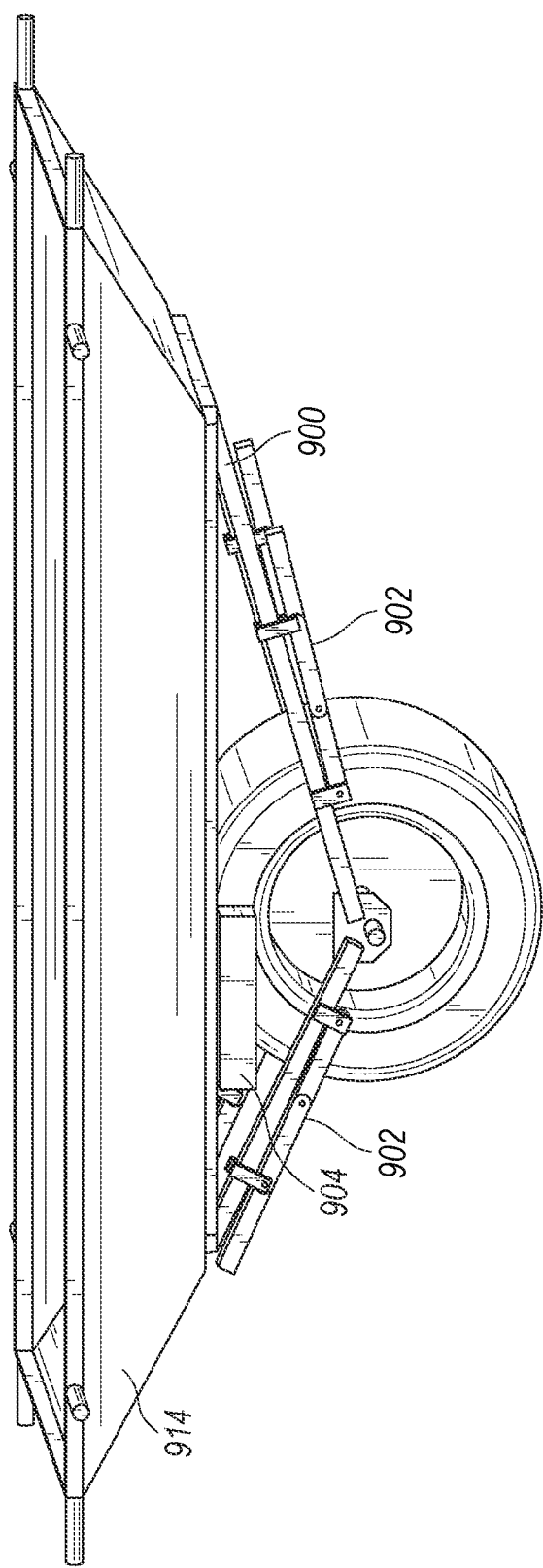
FIG. 9 is a side perspective view which illustrates a particular embodiment of the motorized cart with a battery affixed to the cart frame and foldable kickstands in the folded position.

FIG. 9 is a side perspective view which illustrates a particular embodiment of the motorized cart with a battery affixed to the cart frame and foldable kickstands in the folded position. These kickstands may be extendable/adjustable such that they can independently level the modular article and cart frame on variable terrain. FIG. 9 is substantially similar to FIG. 5 in that it illustrates cart frame 900 with a modular article 914 attached to the top of cart frame 900 and a battery 904 affixed to the underside of the top crossbar of cart frame 900. Additionally, cart 900 comprises foldable kickstands 902 on each angled crossbar that connect to the axle portion of the wheel. Foldable kickstands 902 may be operated according to mechanical and/or electrical means. In one embodiment, the mechanical means that operate the foldable kickstands may be a lever connected to a handle, whereby a cable is attached to the lever and to a spring mechanism locking/unlocking the kickstands. Upon pulling the lever, the kickstands may be deployed. In another embodiment, the electrical means that operate the foldable kickstands may be a button affixed to a handle on the cart frame 900 or modular article 914. The button may comprise an electrical wire that connects the button and a solenoid locking mechanism affixed to the kickstands. Upon pressing the button, an electrical signal is transmitted to the fuse box, then to a wire attached to the solenoid, and then to the solenoid itself, prompting the locking mechanism to unlock and deploy the kickstands.

Figure 10:
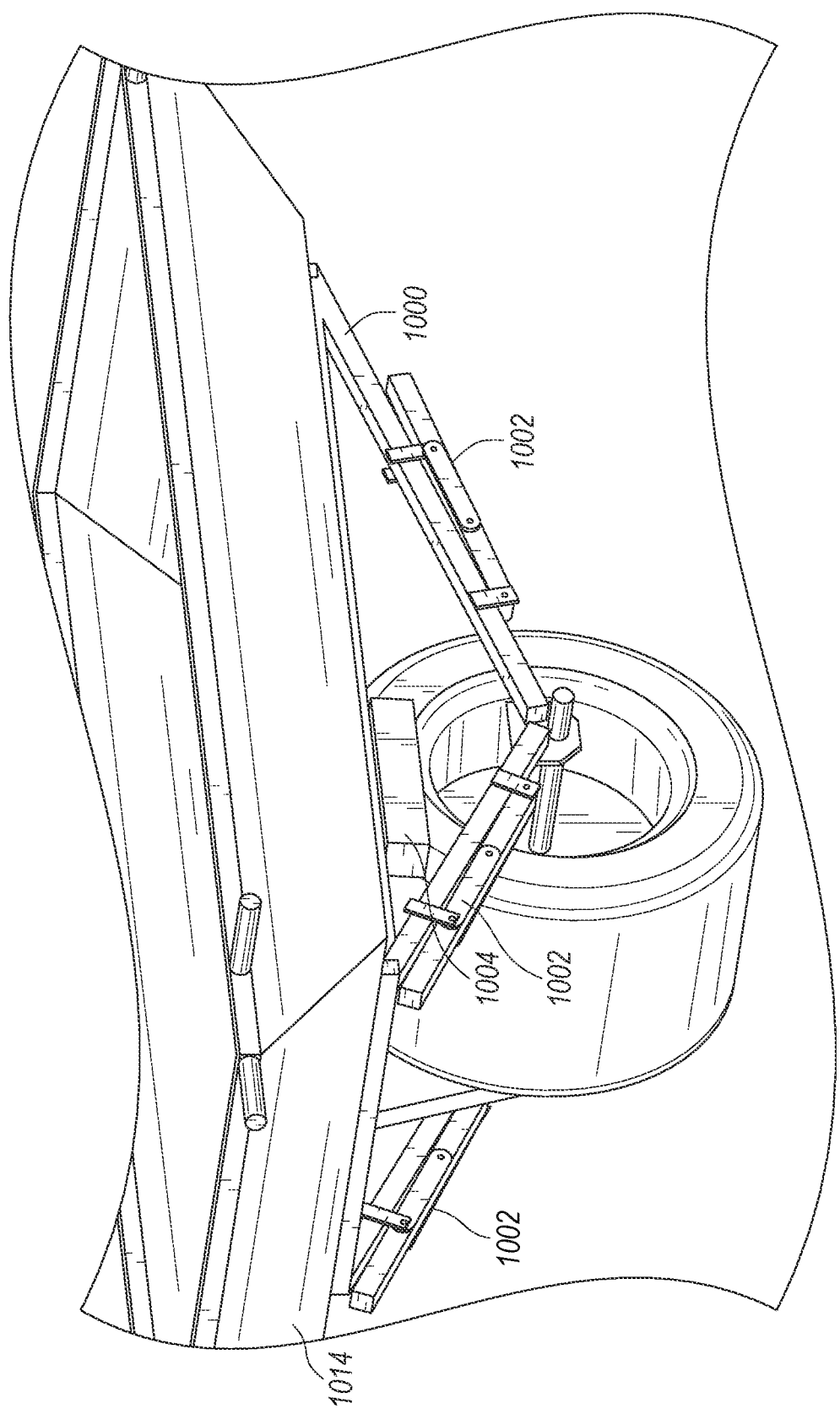
FIG. 10 is an end perspective cutaway view which illustrates a particular embodiment of the motorized cart with a battery affixed to the cart frame and foldable kickstands in the folded position.

FIG. 10 is an end perspective cutaway view which illustrates a particular embodiment of the motorized cart with a battery affixed to the cart frame and foldable kickstands in the folded position. FIG. 10 is substantially similar to FIG. 6 in that it depicts a cart frame 1000, foldable kickstands 1002, battery 1004, and modular article 1014.

Figure 11:
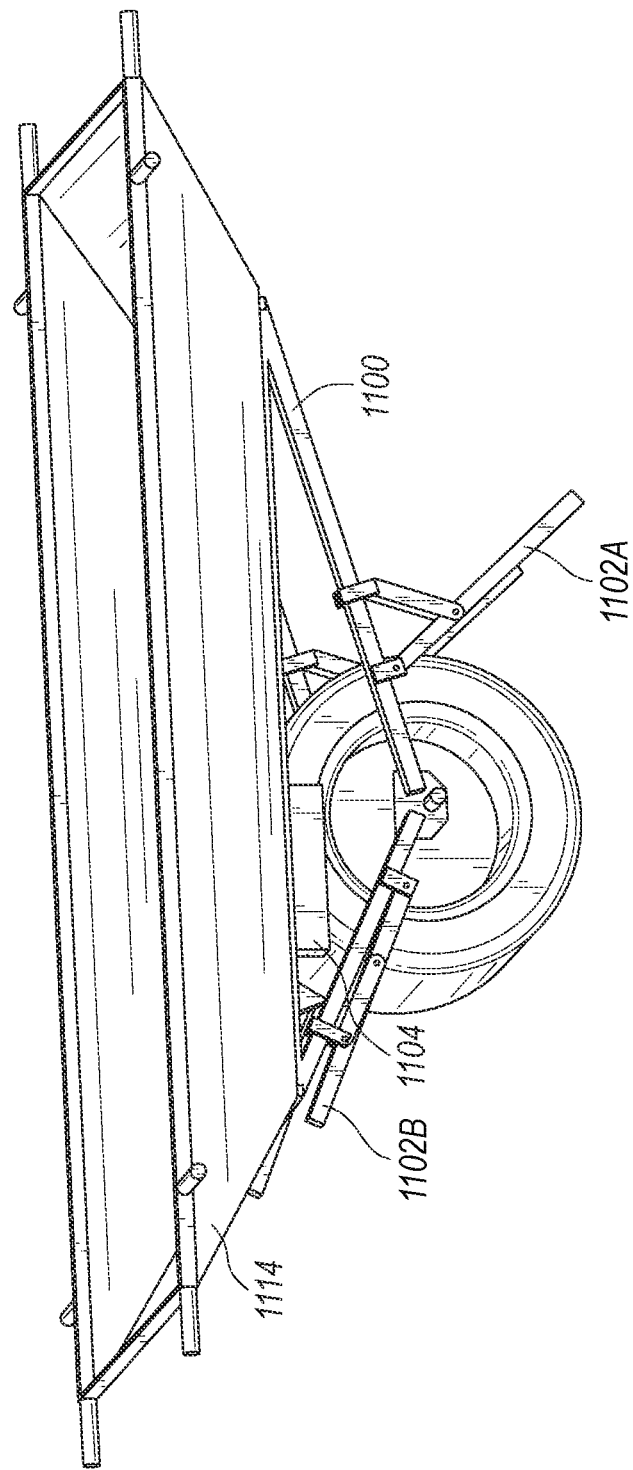
FIG. 11 is a side perspective view which illustrates a particular embodiment of the motorized cart with a battery affixed to the cart frame and foldable kickstands with one of the kickstands in the extended position.

FIG. 11 is a side perspective view which illustrates a particular embodiment of the motorized cart with a battery affixed to the cart frame and foldable kickstands with one of the kickstands in the extended position. FIG. 11 depicts cart frame 1100 with modular article 1114 attached to the top portion of cart frame 1100. Cart frame 1100 also comprises battery 1104 affixed to the underside of one of the top crossbars of cart frame 1100. Cart frame 1100 also comprises kickstands 1102, wherein kickstand 1102A is in the extended position, and kickstand 11028 is in the folded position.

Figure 12:
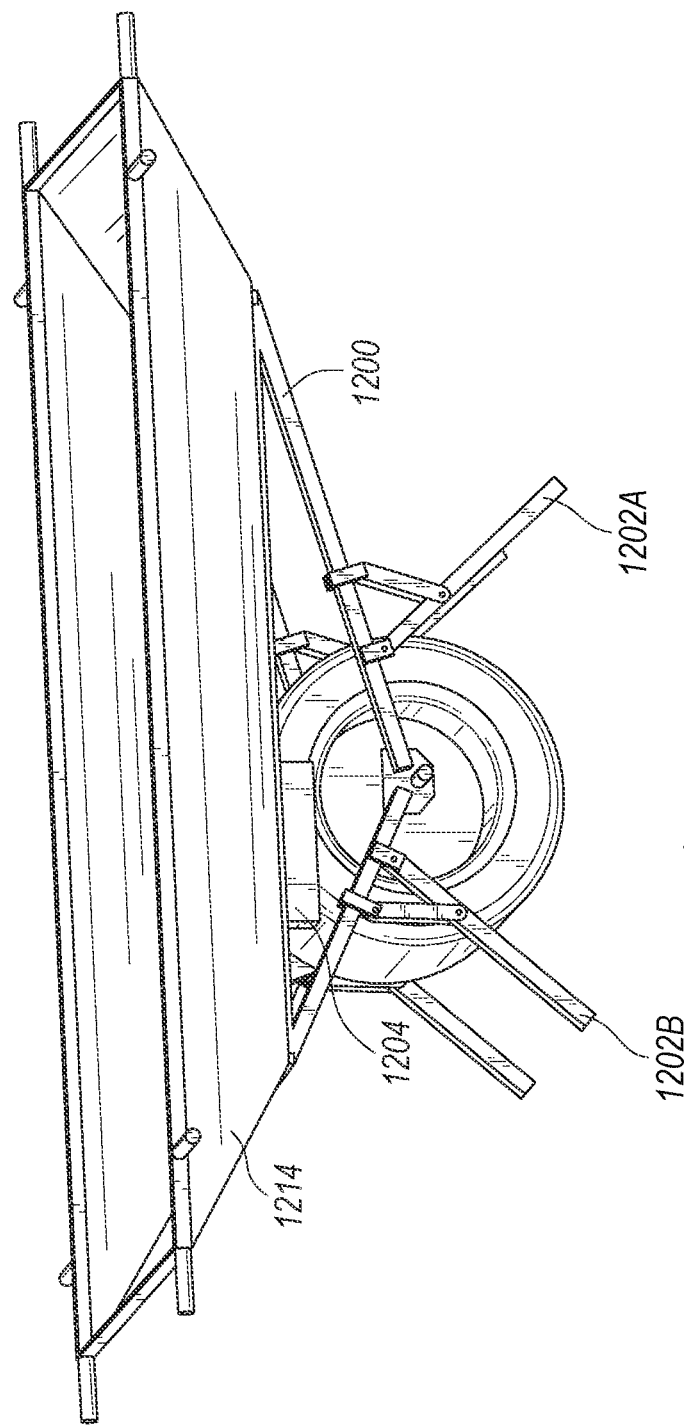
FIG. 12 is a side perspective view which illustrates a particular embodiment of the motorized cart with a battery affixed to the cart frame and foldable kickstands with both of the kickstands in the extended position.

FIG. 12 is a side perspective view which illustrates a particular embodiment of the motorized cart with a battery affixed to the cart frame and foldable kickstands with both of the kickstands in the extended position. FIG. 12 depicts cart frame 1200 with modular article 1214 attached to the top portion of cart frame 1200. Cart frame 1200 comprises battery 1204 and foldable kickstands 1202, wherein kickstands 1202A and 12028 are both illustrated in the extended positions.

Figure 13:
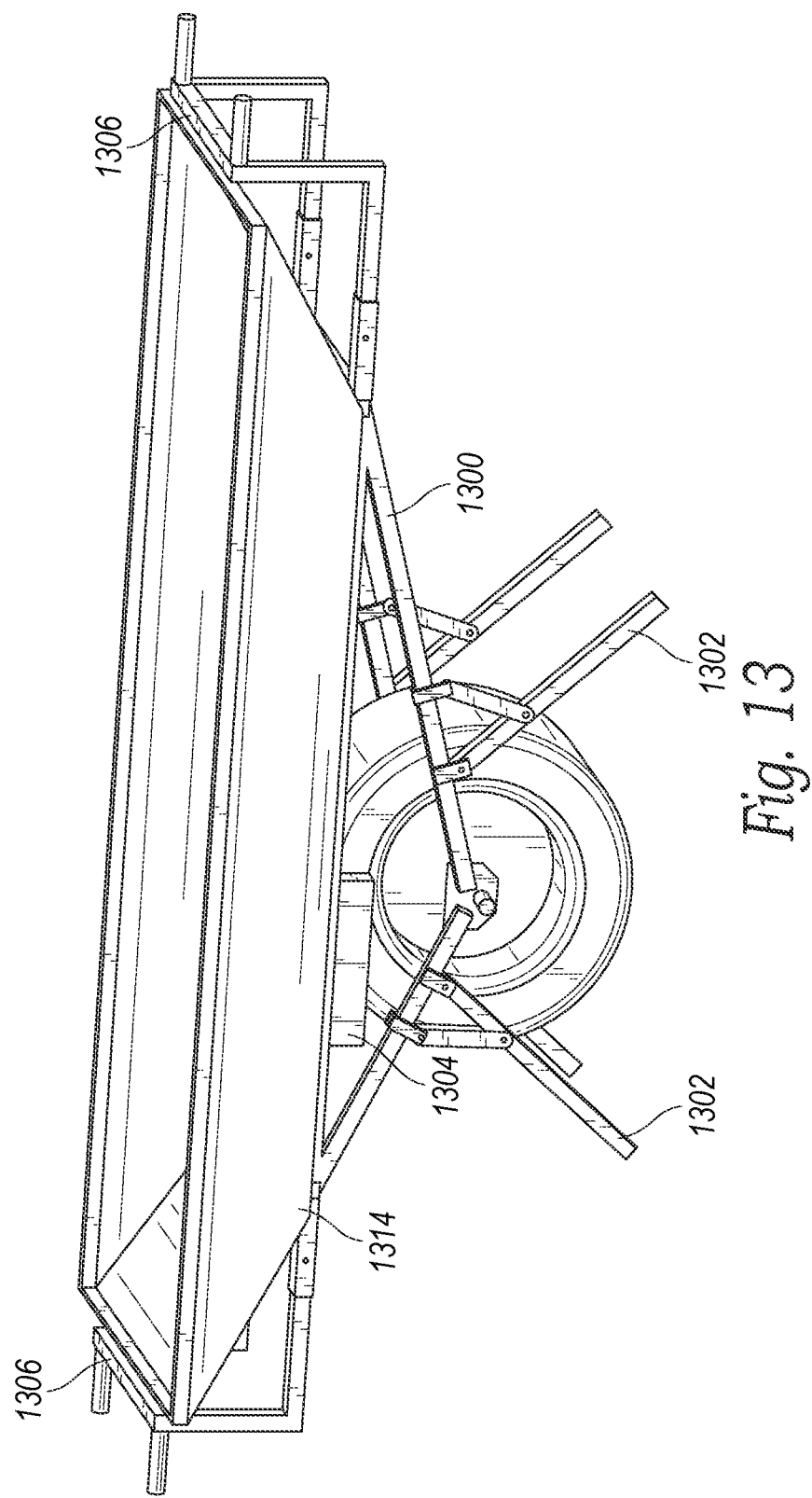
FIG. 13 is a side perspective view which illustrates a particular embodiment of the motorized cart with a battery affixed to the cart frame, foldable kickstands in the extended position, and adjustable handles in the extended position.

FIG. 13 is a side perspective view which illustrates a particular embodiment of the motorized cart with a battery affixed to the cart frame, foldable kickstands in the extended position, and adjustable handles in the extended position. FIG. 13 depicts cart frame 1300 with modular article 1314 attached to the top portion of cart frame 1300. In this particular embodiment, the handles are not affixed to modular article 1314 but rather affixed to the cart frame 1300. The handles 1306 are foldable, and in this embodiment, the handles 1306 are positioned in the extended position. As previously described, each individual handle component protruding from the foldable handle apparatus may be horizontally extendable on the same plane as the top portion of cart frame 1300. Cart frame 1300 may also comprise battery 1304 affixed to the underside of the top crossbar of cart frame 1300, as well as kickstands 1302 (illustrated in the extended position).

Figure 14:
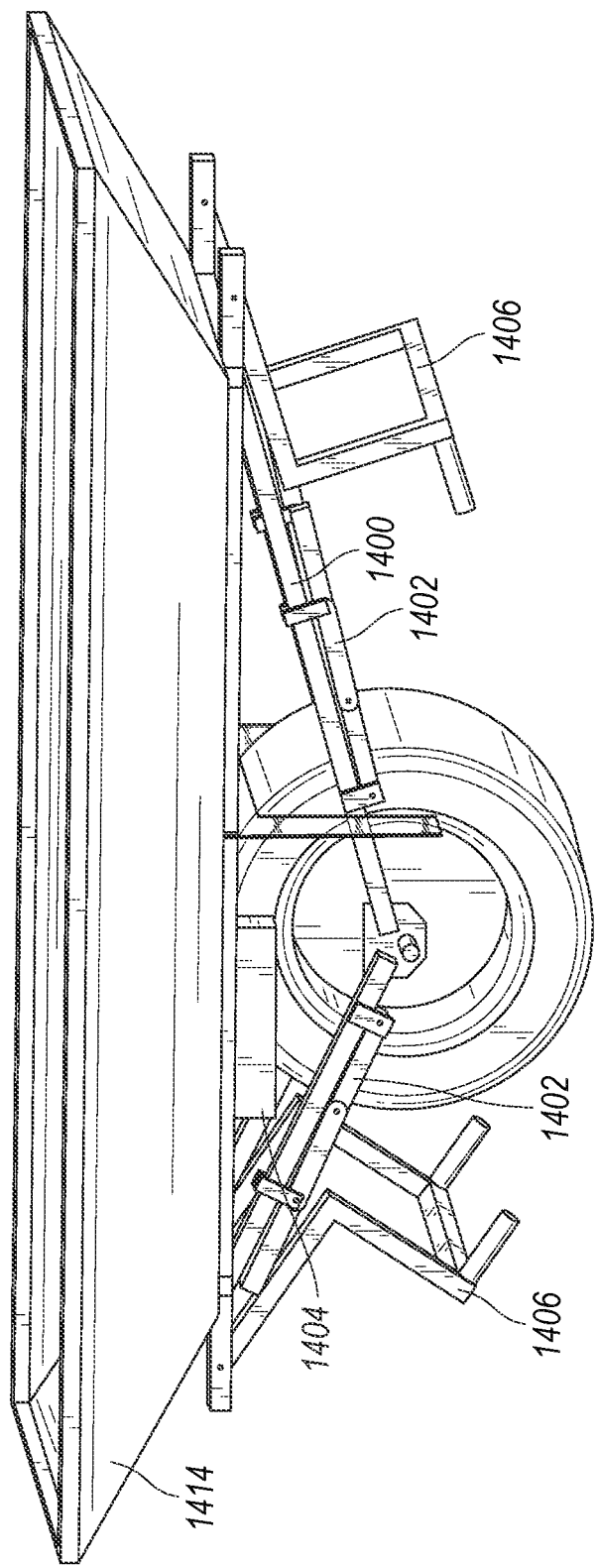
FIG. 14 is a side perspective view which illustrates a particular embodiment of the motorized cart with a battery affixed to the cart frame, foldable kickstands in the folded position, and adjustable handles in the folded position.

FIG. 14 is a side perspective view which illustrates a particular embodiment of the motorized cart with a battery affixed to the cart frame, foldable kickstands in the folded position, and adjustable handles in the folded position. FIG. 14 is substantially similar to FIG. 10. FIG. 14 depicts cart frame 1400 with handles 1406 and kickstands 1402 both in the folded positions. Modular article 1414 is attached to the top portion of cart frame 1400, and battery 1404 is affixed to the underside portion of the top crossbar of cart frame 1400.

Figure 15:
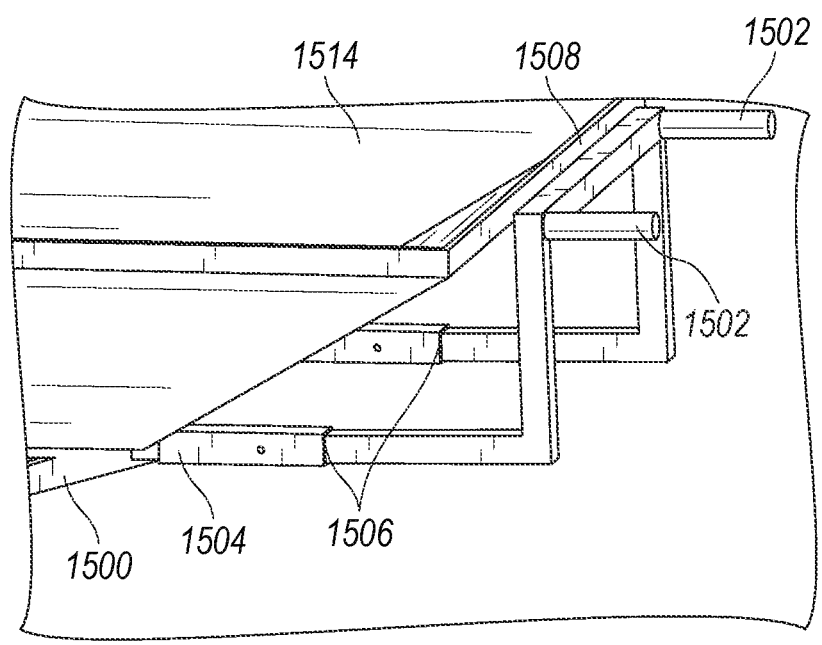
FIG. 15 is a cutaway view of a particular embodiment of adjustable handles in an extended position.

FIG. 15 is a cutaway view of a particular embodiment of adjustable handles in an extended position. FIG. 15 depicts handles affixed to cart frame 1500 on one end of cart frame 1500. The handles may comprise a hinge or QD mechanism 1504, extension mechanism 1506, and/or protruding grips 1502. The hinge or QD mechanism 1504 may allow the handle apparatus to fold, extend, or be removed. For instance, FIG. 15 shows the handles in the extended position with a hinge mechanism 1504 at an obtuse angle to the cart frame 1500. In the folded position, hinge or QD mechanism 1504 may form a smaller angle, as the handles fold down towards the cart frame 1500 and the ground, or allow the handles to be removed entirely. Handle grips 1502 may also be extendable and foldable in some embodiments. Each grip 1502 may be individually extendible and contractible to either lengthen or shorten the length of the grip 1502 in relation to the rest of cart frame 1500. Extension mechanism 1506 may similarly allow the upper portion of the handle apparatus to extend or contract uniformly, or be removed. For instance, a smaller modular article 1514 may require a shorter length of the cart frame 1500, whereby contracting the extension mechanism 1506 may allow the modular article 1514 to fit and connect to fasteners at locations 1508. Alternatively, a bigger modular article 1514 may require the handles to be extended or removed. In other words, the extension mechanism 1506 allows the cart frame 1500 to conform to a variety of sizes to accommodate the size of modular article 1514.

In some embodiments, a fastener may be affixed to the hinge or QD mechanism 1504 so the modular article can be connected to the cart frame 1500. Similarly, a fastener may be connected to the upper-inside portion of the handles at location 1508. When the handles are placed in the folded position, for example, the fastener at location 1508 may become disconnected, allowing the modular article 1514 to be removed from cart frame 1500. Such fasteners at location 1508 may not be the only fasteners attaching the modular article 1514 to the cart frame 1500. For example, as illustrated in FIGS. 2-4, QD mounting points may be affixed to the top portion of the cart frame, providing a variety of locations for modular articles to attach to the cart frame 1500.

Figure 16:
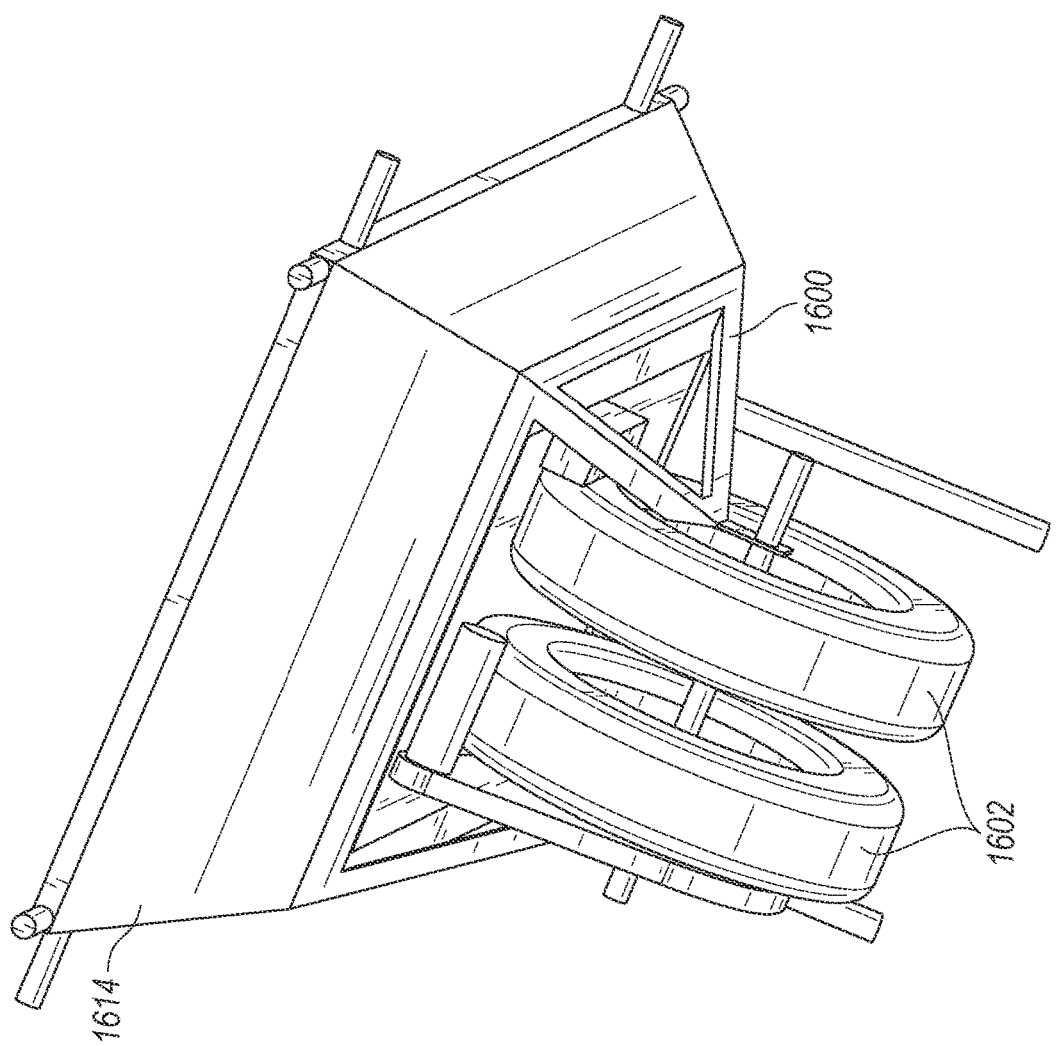
FIG. 16 is a bottom perspective view which illustrates a particular embodiment of the motorized cart with two wheels.

FIG. 16 is a bottom perspective view which illustrates a particular embodiment of the motorized cart with two wheels. FIG. 16 illustrates cart frame 1600 with two wheels 1602 affixed to the bottom portion of cart frame 1600. Modular article 1614 is also connected to the top portion of cart frame 1600. As noted earlier, any number of wheels may be affixed to cart frame 1600. For larger cart frames carrying larger loads within modular article 1614, more wheels may be required. For smaller cart frames carrying smaller loads within modular article 1614, less wheels may be required.

Figure 17:
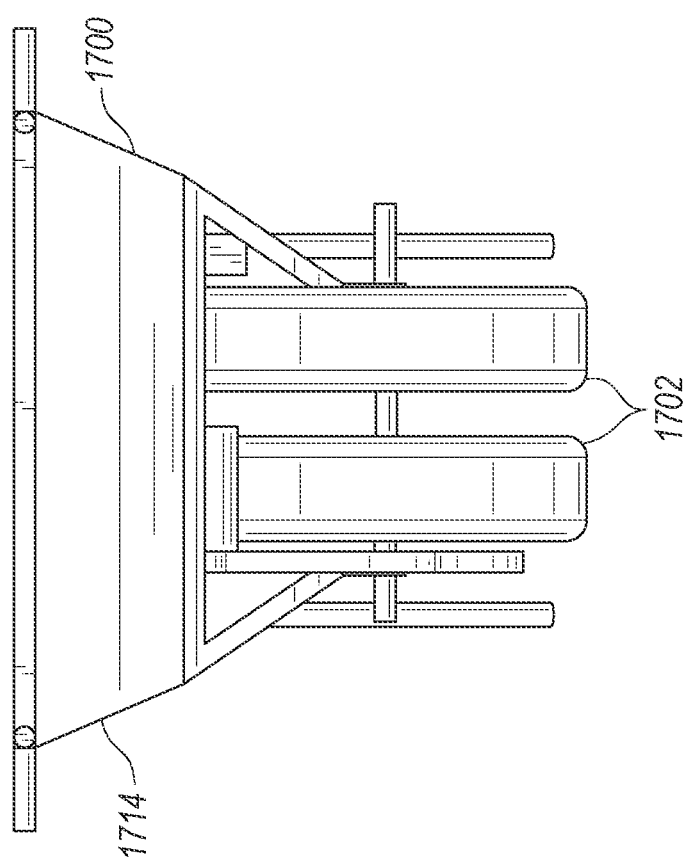
FIG. 17 is a side perspective view which illustrates a particular embodiment of the motorized cart with two wheels.

FIG. 17 is a side perspective view which illustrates a particular embodiment of the motorized cart with two wheels. FIG. 14 is substantially similar to FIG. 17, in that it depicts cart frame 1700 with modular article 1714 connected to the top portion of cart frame 1700 and two wheels 1702 affixed to the bottom portion of cart frame 1700.

Figure 18:
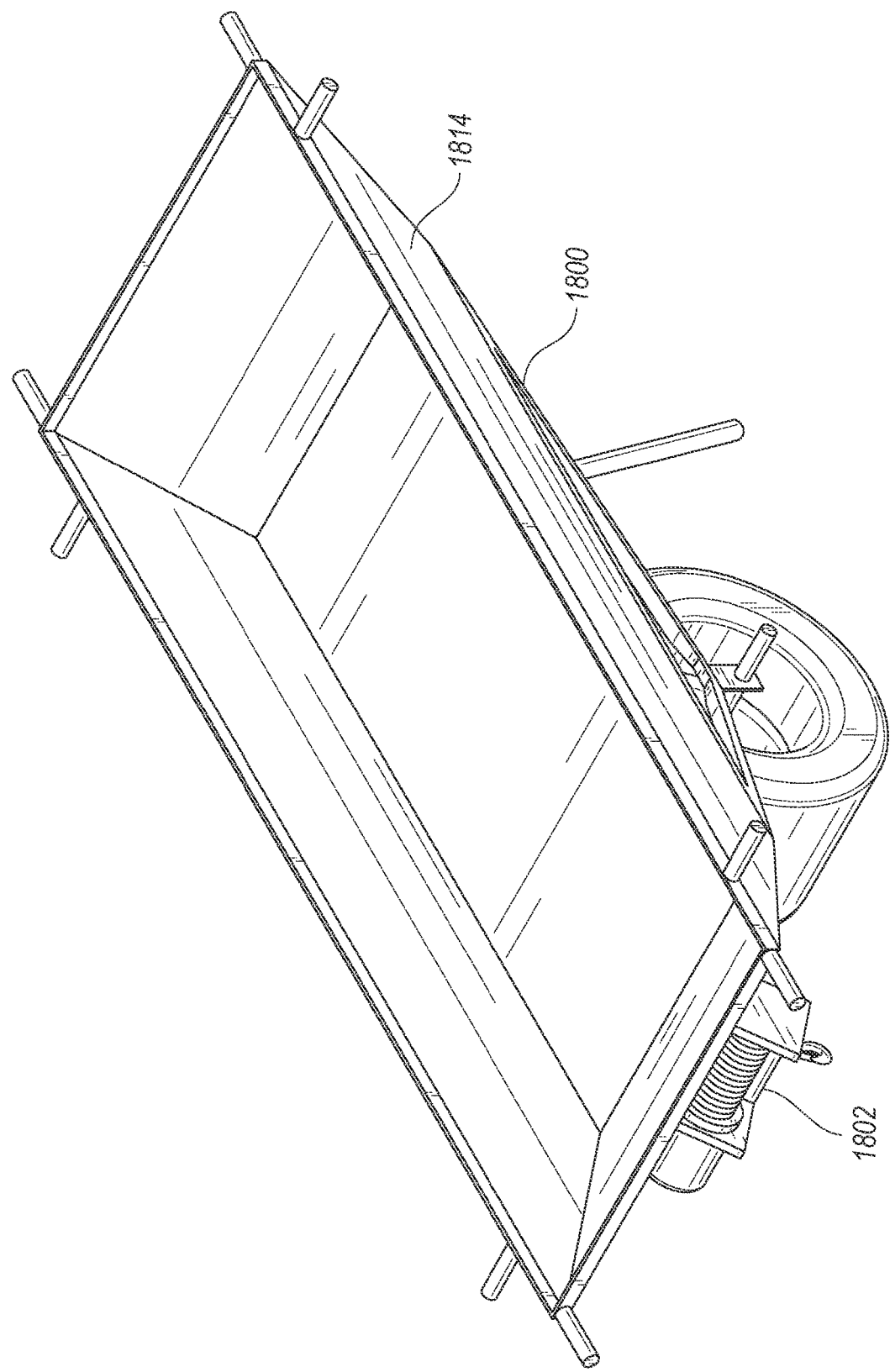
FIG. 18 is a top perspective view which illustrates a particular embodiment of the motorized cart with a winch.

FIG. 18 is a top perspective view which illustrates a particular embodiment of the motorized cart with a winch. FIG. 18 depicts cart frame 1800 with a winch 1802 affixed to the cart frame 1800. In some embodiments, the winch 1802 may be affixed to modular article 1814.

Figure 19:
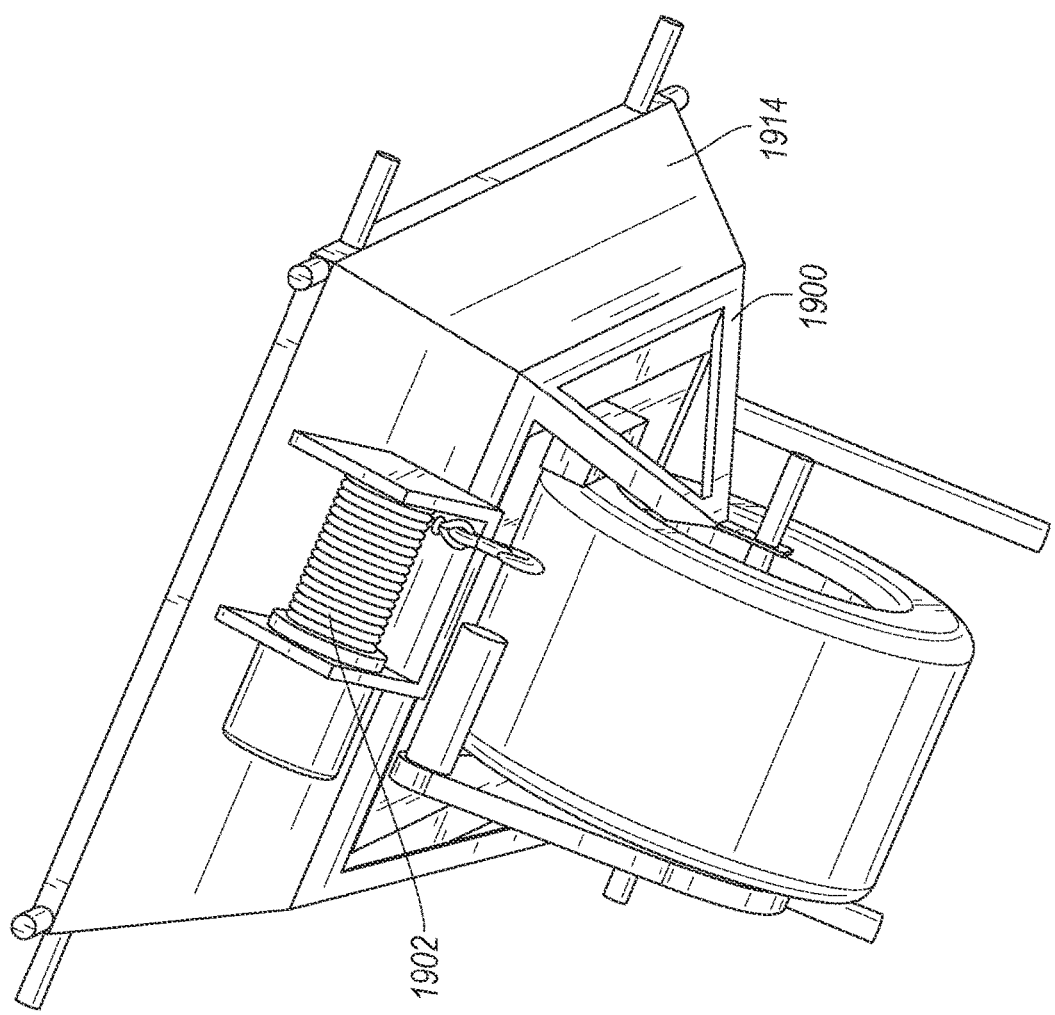
FIG. 19 is a bottom perspective view which illustrates a particular embodiment of the motorized cart with a winch.

FIG. 19 is a bottom perspective view which illustrates a particular embodiment of the motorized cart with a winch. FIG. 19 is substantially similar to FIG. 18, in that it depicts cart frame 1900 with a winch 1902 and modular article 1914 connected to the top portion of cart frame 1900.

Figure 20:
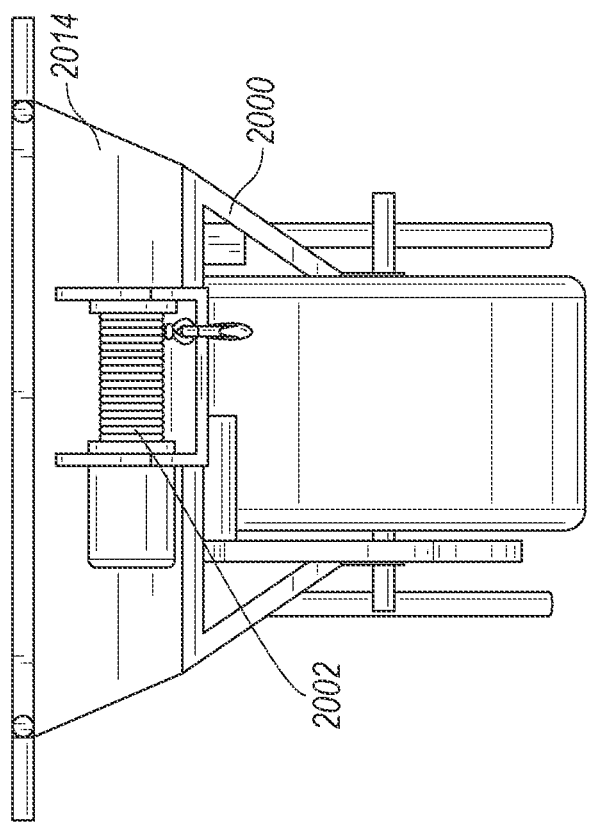
FIG. 20 is an end perspective view which illustrates a particular embodiment of the motorized cart with a winch.

FIG. 20 is an end perspective view which illustrates a particular embodiment of the motorized cart with a winch. FIG. 20 is substantially similar to FIGS. 15 and 16, in that it depicts cart frame 2000, modular article 2014, and winch 2002. In other embodiments, different objects may be attached to at least one end (or both ends) of the cart frame 2000 or the modular article 2014. For example, instead of winch 2002, a tow bar, bumper guard (e.g., hoop bar), spare tire, D-ring shackle, light(s), etc. may be attached to the cart frame 2000 or the modular article 2014.

Figure 21:
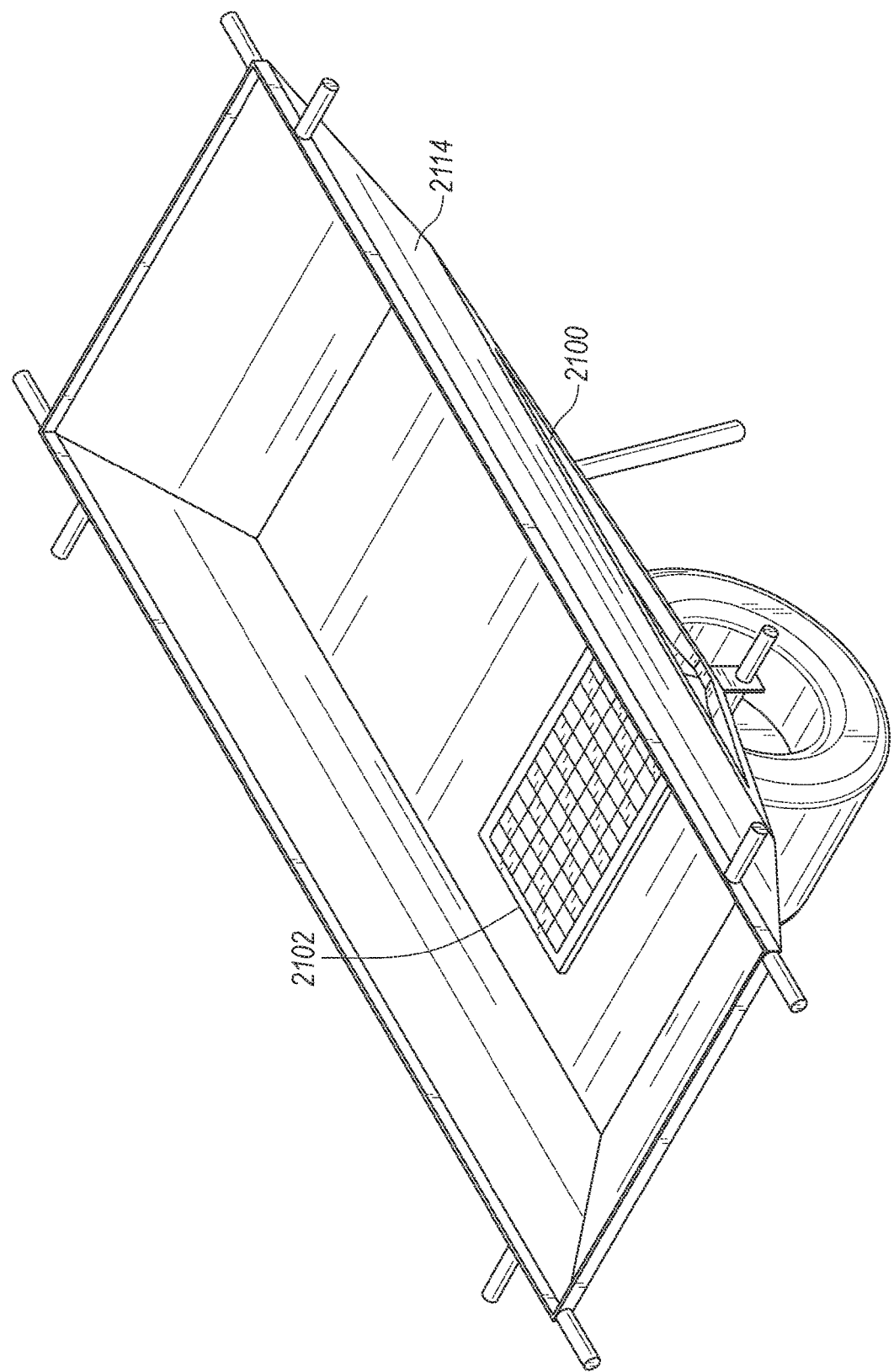
FIG. 21 is a top perspective view which illustrates a particular embodiment of the motorized cart with a solar panel affixed to the inside portion of the modular article.

FIG. 21 is a top perspective view which illustrates a particular embodiment of the motorized cart with a solar panel affixed to the inside portion of the modular article. FIG. 21 depicts cart frame 2100 with modular article 2114 connected to the top portion of cart frame 2100. Inside modular article 2114 is a solar panel 2102 connected to a battery via electrical wire. In some examples, the solar panel 2102 may be connected to a battery via electrical wire (e.g., running through the bottom of modular article 2114). DC electricity may be fed to the battery via a solar regulator which ensures the battery is charged properly and not damaged. The solar panel 2102 is affixed to the bottom portion of the modular article 2114. In this position, the solar panel 2102 may be exposed to sunlight while the cart is in use.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A cart frame, comprising:
   at least one wheel assembly affixed to a bottom portion of the cart frame, wherein the at least one wheel assembly comprises at least one wheel and at least one axle and gear assembly and wherein the at least one wheel assembly comprises at least one wheel fastener, and wherein the at least one wheel is housed within the cart frame;
   at least one handle affixed to the cart frame, wherein the handle comprises a throttle assembly and a brake assembly;
   at least one engine affixed to the cart frame;
   at least one quick-detach (QD) fastener affixed to a top portion of the cart frame configured to attach to at least one modular article; and
   at least one kickstand affixed to at least one lower crossbar of the cart frame, wherein the at least one kickstand is foldable and extendable and wherein the at least one kickstand is controlled by at least one quick-release mechanism affixed to the at least one handle on the cart frame.

2. The cart frame of claim 1, wherein the at least one wheel fastener is a quick-release.

3. The cart frame of claim 1, wherein the at least one wheel assembly comprises at least two wheels.

4. The cart frame of claim 1, wherein the at least one engine is at least one of: a combustion engine and an electric engine.

5. The cart frame of claim 1, further comprising at least one storage cavity affixed to at least one crossbar of the cart frame.

6. The cart frame of claim 5, wherein the at least one storage cavity is enclosed and comprises a bottom wall and two side walls.

7. The cart frame of claim 1, further comprising at least one of: a winch, a solar panel, a tow bar, a bumper guard, a spare tire, a D-ring shackle, and a light.

8. The cart frame of claim 1, wherein the at least one handle is foldable, adjustable, or removable via at least one of: a hinge and a QD mechanism.

9. The cart frame of claim 8, wherein the at least one handle is foldable, adjustable, or removable such that an end of the at least one handle distal the cart frame may be configured to engage a surface.

10. The cart frame of claim 1, wherein the at least one handle is extendable via at least one extension mechanism.

11. The cart frame of claim 1, wherein the at least one quick-release mechanism is at least one of: a mechanical lever and an electrical push button switch.

12. A motorized cart, comprising:
a cart frame;
at least one wheel assembly affixed to the cart frame, wherein the at least one wheel assembly comprises an axle and a gear and wherein the at least one wheel assembly comprises at least one wheel fastener, and wherein the at least one wheel assembly comprises at least one wheel housed within the cart frame;
at least one handle affixed to the cart frame, wherein the handle comprises a throttle assembly and a brake assembly and wherein the at least one handle is foldable and extendable;
at least one engine affixed to the cart frame;
at least one modular article connected to a top portion of the cart frame via at least one quick detach (QD) fastener; and
at least one kickstand affixed to at least one lower crossbar of the cart frame, wherein the at least one kickstand is foldable and extendable and wherein the at least one kickstand is controlled by at least one quick-release mechanism affixed to the at least one handle on the cart frame.

13. The motorized cart of claim 12, wherein the at least one engine is an electric engine.

14. The motorized cart of claim 13, wherein the electric engine is powered by at least one battery connected to at least one solar panel affixed to the motorized cart.

15. The motorized cart of claim 12, wherein the at least one modular article comprises connection means configured to attach to an aerial vehicle hoist.

16. A modular cart, comprising:
a cart frame, wherein the cart frame comprises at least two QD mounting points affixed to a top portion of the cart frame;
at least one wheel assembly affixed to the cart frame, wherein the at least one wheel assembly comprises a quick-release fastener;
at least one handle affixed to the cart frame, wherein the handle comprises a throttle assembly and a brake assembly and wherein the at least one handle is foldable and extendable;
at least one engine affixed to the cart frame;
at least one modular article connected to the top portion of the cart frame via the at least two QD mounting points; and
at least one kickstand affixed to at least one lower crossbar of the cart frame, wherein the at least one kickstand is foldable and extendable and wherein the at least one kickstand is controlled by at least one quick-release mechanism affixed to the at least one handle on the cart frame.

\* \* \* \* \*